United States Patent
Wolf et al.

(10) Patent No.: US 9,416,853 B2
(45) Date of Patent: Aug. 16, 2016

(54) CLAMPING DEVICE FOR A BELT DRIVE

(71) Applicant: Schaeffler Technologies AG & Co. KG, Herzogenaurach (DE)

(72) Inventors: Benjamin Wolf, Bubenreuth (DE); Roland Arneth, Eggolsheim (DE); Bernd Hartmann, Weisendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 226 days.

(21) Appl. No.: 14/364,481

(22) PCT Filed: Dec. 5, 2012

(86) PCT No.: PCT/EP2012/074431
§ 371 (c)(1),
(2) Date: Jun. 11, 2014

(87) PCT Pub. No.: WO2013/087467
PCT Pub. Date: Jun. 20, 2013

(65) Prior Publication Data
US 2014/0342862 A1   Nov. 20, 2014

(30) Foreign Application Priority Data
Dec. 15, 2011   (DE) .......................... 10 2011 088 652

(51) Int. Cl.
*F16H 7/12*   (2006.01)
*F02B 67/06*   (2006.01)
*F16H 7/08*   (2006.01)

(52) U.S. Cl.
CPC .............. *F16H 7/1281* (2013.01); *F02B 67/06* (2013.01); *F16H 7/1218* (2013.01); *F16H 2007/0806* (2013.01); *F16H 2007/0874* (2013.01); *F16H 2007/0893* (2013.01)

(58) Field of Classification Search
CPC ................ F16H 7/1281; F16H 7/1218; F16H 2007/0806; F16H 2007/0874; F16H 2007/0893; F02B 67/06
USPC .......................................................... 474/117
See application file for complete search history.

(56) References Cited

U.S. PATENT DOCUMENTS 2,954,726 A * 10/1960 Kerridge ................ E01C 19/286
                                                      404/114
6,648,783 B1 * 11/2003 Bogner .................. F16H 7/1281
                                                      474/134

(Continued)

FOREIGN PATENT DOCUMENTS

DE           19926615       12/2000
DE        102006019877      10/2007

(Continued)

*Primary Examiner* — William E Dondero
*Assistant Examiner* — Robert T Reese
(74) *Attorney, Agent, or Firm* — Volpe and Koenig, P.C.

(57) ABSTRACT

A clamping device (2) for a starter generator belt drive of an internal combustion engine. The clamping device includes a tensioner housing (8), a tensioning arm (17) mounted movably therein, and two idlers (6, 7), one of which is mounted to the tensioning arm and the other of which is mounted to the tensioner housing (8) in a stationary manner. A spring component which generates the pre-load force includes two helical compression springs (20a, 20b) connected in series, the facing spring ends (23a, 23b) of which are separated by an intermediate piece (24) mounted in the tensioner housing in a sliding manner. The tensioning arm has a pin projection (28), which extends through the helical compression springs running inside the tensioning arm and which is mounted in the intermediate piece in a sliding manner.

3 Claims, 2 Drawing Sheets

(56) References Cited

U.S. PATENT DOCUMENTS

| | | | |
|---|---|---|---|
| 8,968,128 B2 * | 3/2015 | Wolf | F16H 7/1281 474/135 |
| 9,097,314 B2 * | 8/2015 | Wolf | F16H 7/1281 |
| 9,182,015 B2 * | 11/2015 | Mack | F16H 7/1281 |
| 2009/0298631 A1 * | 12/2009 | Jud | F16H 7/1281 474/237 |
| 2013/0040770 A1 * | 2/2013 | Wolf | F16H 7/1281 474/134 |
| 2014/0256488 A1 * | 9/2014 | Wolf | F16H 7/1281 474/135 |

FOREIGN PATENT DOCUMENTS

| | | |
|---|---|---|
| DE | 102008025552 | 12/2009 |
| DE | 102011082764 | 4/2012 |
| DE | 102011084680 | 11/2012 |
| DE | 102011082330 | 2/2013 |
| JP | 2010091027 | 4/2010 |

* cited by examiner

CLAMPING DEVICE FOR A BELT DRIVE

The invention relates to a tensioning device for a belt drive that has an endlessly circulating belt, an electric machine with a drive wheel, and at least one additional drive wheel that is in drive connection to the drive wheel via the belt, wherein the tensioning device comprises the following:
- tensioner housing that is supported on the electric machine so that it can pivot about the axis of the drive wheel,
- a tensioning arm that is supported so that it can move in the tensioner housing,
- two tensioning rollers that apply a biasing force on the belt in front of and behind the drive wheel in the circulating direction of the belt, wherein one of the tensioning rollers is supported on the tensioning arm and the other tensioning roller is supported fixed in place on the tensioner housing,
- and a spring component that generates the biasing force and whose spring ends are clamped between the tensioner housing on one side and the tensioning arm on the other side.

BACKGROUND

In belt drives with drive wheels that alternately receive and output torque and a corresponding change from tensioned belt section to slack belt section, the tensioning of the slack belt section requires a tensioning device with two tensioning rollers that bias the belt in front of and behind the drive wheel that alternately drives and is driven. This typically—but not necessarily—involves the belt drive of an internal combustion engine with an electric machine in the form of a starter generator that is driven not for the purpose of generating power from the internal combustion engine, but instead also drives the internal combustion engine, in order to start the engine.

Known tensioning devices, as proposed, for example, in DE 199 26 615 A1, DE 10 2008 025 552 A1, and DE 10 2006 019 877 A1, each have a tensioner housing mounted on the starter generator and two tensioning arms that can move in this housing, wherein a force is applied on each other with the corresponding tensioning rollers by a spring component arranged in-between, in order to tension the belt.

A tensioning device of the type named above, i.e., with only one tensioning arm supported so that it can move in the tensioner housing on one side and a housing-fixed tensioning roller on the other side is known from the unpublished documents DE 10 2011 082 764 A1, DE 10 2011 082 330 A1, and DE 10 2011 084 680 A1. The two sliding bearing points for the tensioning arm are formed there as bearing shells that are arranged at a distance to each other either fixed in place in the tensioner housing or fixed in place on the tensioning arm, so that the relative motion in the sliding bearing is realized either between the bearing shell and the tensioning arm or between the bearing shell and the tensioner housing. The distance of the two bearing shells determining the guide length of the tensioning arm and consequently the length of the tensioning arm section in the tensioner housing is determined, on one hand, according to the permissible tilting of the tensioning arm caused by the sliding bearing play perpendicular to the plane of the belt and, on the other hand, for the specified available installation space of the tensioner housing, according to the required installation space of the spring component applying a force on the tensioning arm.

SUMMARY

Starting from this situation, the present invention is based on the objective of improving a tensioning device of the type named above, both in terms of the low-tilting sliding bearing of the tensioning arm in the tensioner housing and also in terms of the characteristics of the spring component.

The solution is provided in that the spring component comprises two helical compression springs connected in series. Their facing spring ends are separated by an intermediate piece supported so that it can slide in the tensioner housing, wherein the tensioning arm has a pin projection that passes through the helical compression spring on the side of the tensioning arm and is supported so that it can slide in the intermediate piece. The series connection of the springs according to the invention allows the sliding bearing point of the tensioning arm farther inside in the tensioner housing to be arranged between the two springs in the form of the intermediate piece supported in a floating manner, wherein the spring interior bounded by the spring windings is used as installation space for the tensioning arm formed there as a pin projection. Because a part of the housing installation space is used by the tensioning arm and also by the spring component, both the sliding bearing distance can be increased in terms of a more tilting-stable guidance of the tensioning arm in the tensioner housing and also the effective length of the spring component can be increased in terms of spring characteristics with a flat spring characteristic curve for a specified spring bias and a large travel.

The tensioning arm and the helical compression spring can basically have a straight shape and, with respect to the springs, a conventional, cylindrical shape. To promote a radially compact installation space for the tensioning device, however, it is useful if the tensioning arm has a circular arc-shaped design and the helical compression springs are formed as bow springs.

Advantageously, the bow springs are carry-over parts. In this case, for positioning movements of the tensioning arm, its relative path with respect to the intermediate piece and the relative path of the intermediate piece with respect to the tensioner housing are the same size and each equal half the positioning path of the tensioning arm.

BRIEF DESCRIPTION OF THE DRAWINGS

One embodiment of the invention is explained with reference to the drawings described below. Shown are.

If not mentioned otherwise, identical or functionally identical features or components are provided with the same reference symbols.

DETAILED DESCRIPTION OF THE PREFERRED EMBODIMENTS

Figure 1:
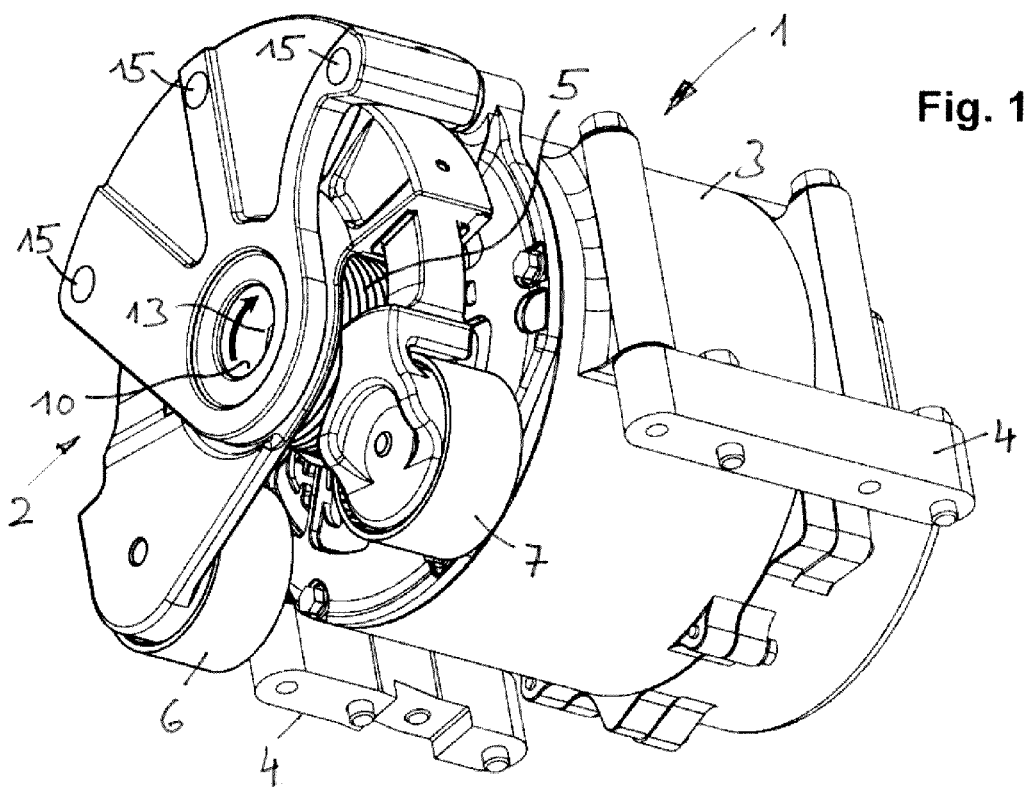
FIG. 1 the electric machine known from DE 10 2011 084 680 A1 with tensioning device mounted on this electric machine in a perspective assembly diagram.

The electric machine 1 shown in FIG. 1 involves a starter generator of an auxiliary belt drive of an internal combustion engine, wherein the starter generator 1 is combined with a tensioning device 2 for an endlessly circulating poly-V belt (not shown) into one structural unit. The starter generator 1 comprises a generally cylindrical machine housing 3 that is here bolted to the internal combustion engine via adapters 4. On the front side of the machine housing 3 there is a drive wheel 5 that is screwed on a central drive shaft (not visible) and is in drive connection via the belt with at least the crankshaft drive wheel (also not shown) of the internal combustion engine.

The crankshaft drive wheel is driven in a known way by the drive wheel 5 of the starter generator 1 for starting the internal combustion engine, in order to drive the drive wheel 5 for generating power when the internal combustion engine has started. The drive wheel 5 that alternately outputs and receives torque causes a synchronous switching of the tensioned belt section and slack belt section in the belt drive that has the circulating direction of the belt indicated by the arrow next to the drive wheel 5. During the startup operation of the internal combustion engine, the belt section that is in front of the driving drive wheel 5 in the circulating direction of the belt is the tensioned belt section and the belt section that is behind the drive wheel 5 in the circulating direction of the belt is the slack belt section. Conversely, in the generator mode, the belt section that is in front of the then driven drive wheel 5 in the circulating direction of the belt is the slack belt section and the belt section that is behind the drive wheel 5 in the circulating direction of the belt is the tensioned belt section.

The tensioning device 2 is mounted on the front side on the machine housing 3 and comprises two tensioning rollers 6 and 7 that apply a biasing force on the belt in front of and behind the drive wheel 5, respectively, in the circulating direction of the belt, in order to tension the alternating slack belt section of the belt drive.

Figure 2:
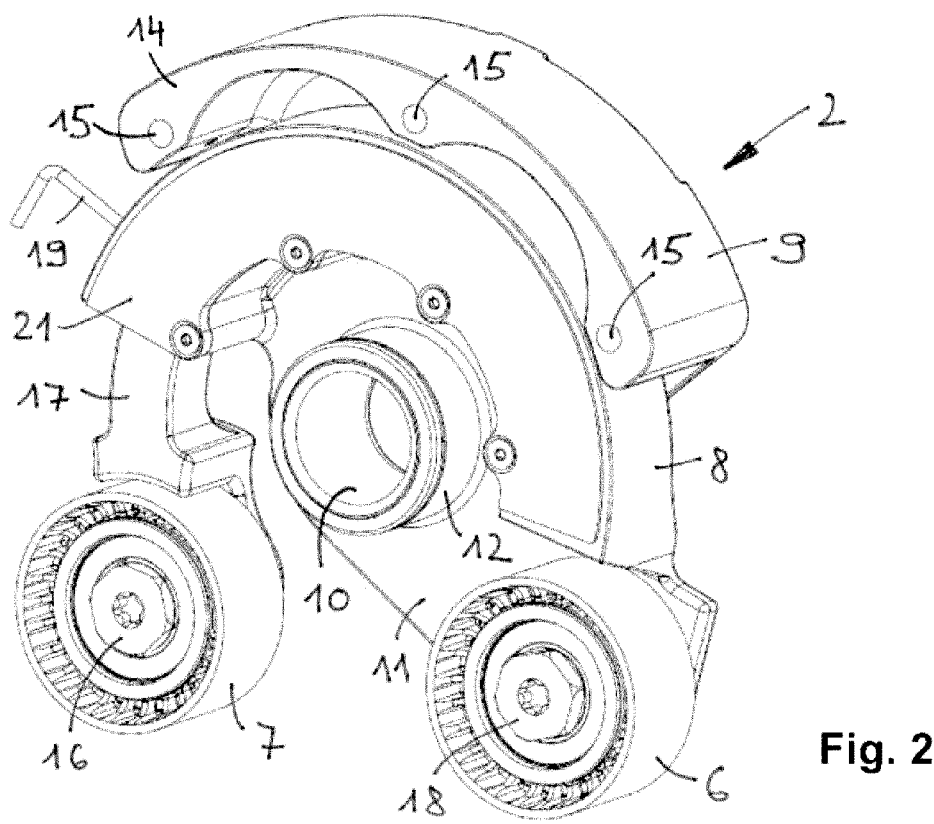
FIG. 2 the known tensioning device according to FIG. 1 in a perspective rear view of the tensioner housing.

FIG. 2 shows the tensioning device 2 as a structural unit before its installation on the electric machine 1 in the assembly. The tensioning device 2 comprises a tensioner housing 8 and a bearing carrier 9 with a bearing point 10 at which the tensioner housing 8 is supported with the tensioning rollers 6, 7 so that it can pivot relative to the bearing carrier 9. The bearing point 10 is a bearing journal that starts from an end wall 11 of the bearing carrier 9 running axially adjacent to the tensioner housing 8 and extends to the tensioner housing 8. The tensioner housing 8 is provided with a cylindrical projection 12 that is supported so that it can slide on the bearing journal 10.

As can be seen from the assembly according to FIG. 1, the hollow cylindrical bearing journal 10 is concentric to the drive wheel 5. This means, on one hand, that the pivot bearing of the tensioning device 2 and the rotational axis of the drive wheel 5 are coaxial and is a requirement, on the other hand, that the axle bolt 13 of the drive wheel 5 (can be seen only partially as a corner of an axle nut) is mounted in the interior of the bearing journal 10, saving axial installation space. This is on the side of the drive wheel 5 that faces away from the machine housing 3 and the bearing carrier 9 spans the tensioner housing 8 axially with a screw-on flange 14 that has an essentially circular arc-shaped construction corresponding to the cylindrical shape of the machine housing 3. The bearing carrier 9 is fastened on the front side of the machine housing 3 by a threaded connection at three fastening points 15 (the threaded connection itself is not shown in FIG. 1).

The tensioning roller 7 arranged behind the drive wheel 5 in the circulating direction of the belt is supported by means of an axle bolt 16 on a tensioning arm 17 that is supported against the force of a spring component held in the tensioner housing 8 and not visible here so that it can move in the tensioner housing 8 about the rotational axis of the drive wheel 5. On the other hand, the tensioning roller 6 is supported fixed in place on the tensioner housing 8 by an axle bolt 18. A locking pin 19 inserted through a housing hole into a tensioning arm hole (both holes are not visible) is used as an installation securing device that fixes the tensioning arm 17 in a pre-tensioned transport position opposite the tensioner housing 8 before the belt drive is mounted.

The pivoting sliding bearing of the tensioner housing 8 for an operating change of the starter generator 1 and a corresponding change from tensioned belt section with slack belt section in the belt drive, the tensioner housing 8 pivots with the tensioning rollers 6, 7 about the rotational axis of the drive wheel 5. If, for example, the starter generator 1 changes from the starter mode to the generator mode, then the belt section on the part of the moving, housing-side tensioning roller 7 changes from slack belt section to tensioned belt section and on the part of the fixed, housing-side tensioning roller 6 changes from tensioned belt section to slack belt section. Consequently, this mode change leads to a pivoting of the tensioner housing 8 from the current tensioned belt section on the part of the tensioning roller 7 into the current slack belt section on the part of the tensioning roller 6, i.e., for the indicated circulating direction of the belt according to FIG. 1 for a pivoting opposite the circulating direction. Here, the biasing force in the belt drive is always maintained by the spring component within the tensioner housing that applies a compressive force on the tensioning arm 17 out from the tensioner housing 8.

This method of operation of the tensioning device 2, i.e., pivoting the tensioning to the current slack belt section, also causes a so-called decoupling of the rotating starter generator mass from the crankshaft of the internal combustion engine. This decoupling typically uses a decoupler on the generator (e.g., a generator freewheel) or on the crankshaft, wherein, in conventional generator machines without a starter mode, this decoupler is arranged on the generator or on the crankshaft and decouples the comparatively slowly rotating generator mass from the crankshaft when the gradient of its rotational speed is negative. That is, the tensioning device 2 according to the invention can also be used in conventional generator belt drives (without starter mode) as an alternative or as a support to the decoupler.

Figure 3:
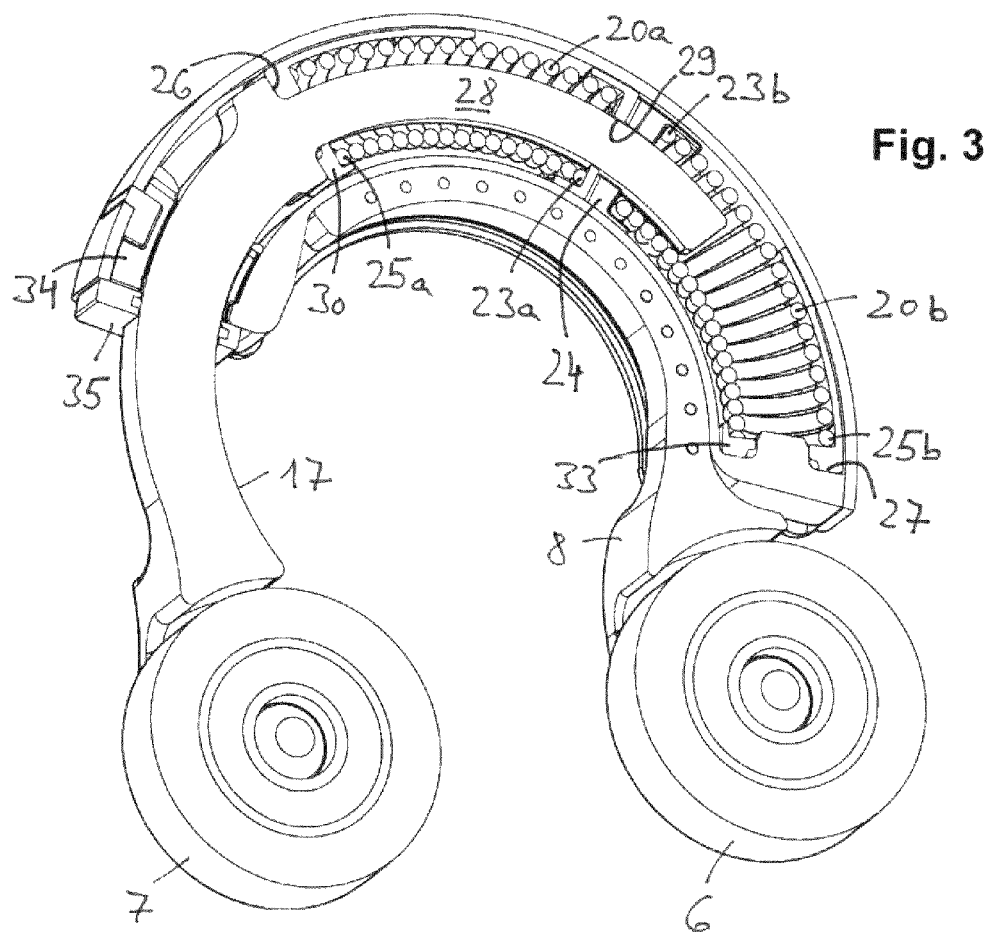
FIG. 3 a tensioning device modified according to the invention with opened tensioner housing in cross section, and FIG. 4 the tensioning device according to FIG. 3 without spring component in an enlarged view.
Figure 4:
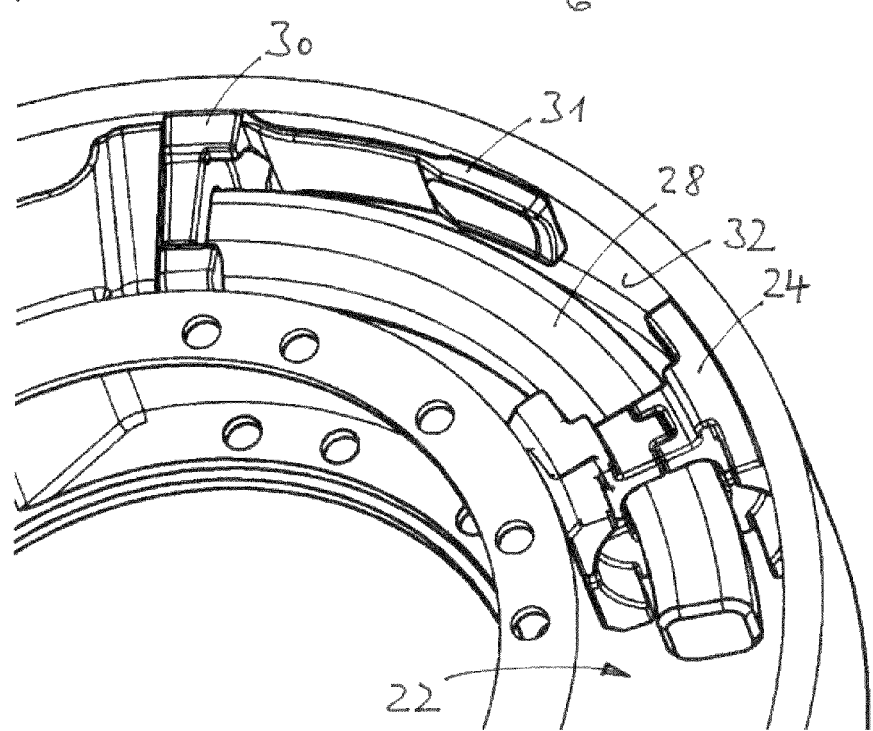

FIGS. 3 and 4 show a modified tensioner housing 8 from which the structural construction according to the invention of the spring component generating the belt bias can be seen in connection with the support of the tensioning arm 17. The tensioner housing 8 is shown there open, i.e., without the housing cover 21 according to FIG. 2 screwed to the housing. In the interior of the tensioner housing 8 there is a circular arc-shaped receptacle space 22 that has a rectangular cross section for the tensioning arm 17 supported so that it can move in this space and for the spring component. This includes two helical compression springs connected in series and here structurally identical bow springs 20*a* and 20*b* with the curvature of the receptacle space 22 whose inner spring ends 23*a* and 23*b* facing each other are separated by an intermediate piece 24 supported in the receptacle space 22 so that it can slide. The outer spring ends 25*a* and 25*b* are clamped between a set-off section 26 of the tensioning arm 17 on one side and an end wall 27 of the receptacle space 22 on the other side. The tensioning arm part within the receptacle space 22 is constructed as a corresponding circular arc-shaped pin projection 28 that passes through the bow spring 20*a* on the side of the tensioning arm 17 and is supported so that it can slide in a hole 29 of the intermediate piece 24. The pin projection 28 and the shape-fitting hole 29 are secured against relative rotation with a positive-fit connection with an essentially square cross section, wherein the tensioning arm 17 with its tensioning roller 7 is also prevented from impermissibly high tilting relative to the belt plane.

The outer spring end 25*a* on the side of the tensioning arm is supported on the tensioning arm 17 by a sliding bearing piece 30 that is provided with a tab 31. This prevents a direct contact of the bow spring 20a with the supporting longitudinal wall 32 of the receptacle space 22. In the same way, the bow spring 20b is supported with its outer spring end 25b on the end wall 27 via a spacer 33. Another sliding bearing piece 34 closes the receptacle space 22 on the side of the tensioning arm 17. A sealing element 35 protects the receptacle space 22 from penetrating foreign particles.

The sliding bearing pieces 30, 34 and the intermediate piece 24 and also the spacer 33 are used not only for the moving support, but also—due to the sliding friction—for vibration damping of the tensioning arm 17 and the bow springs 20a, 20b in the tensioner housing 8. As the material, a polyamide with embedded dry lubricant in the form of PTFE (polytetrafluoroethylene) is provided.

LIST OF REFERENCE NUMBERS

1 Electric machine/starter generator
2 Tensioning device
3 Machine housing
4 Adapter
5 Drive wheel
6 Fixed tensioning roller
7 Movable tensioning roller
8 Tensioner housing
9 Bearing carrier
10 Bearing point/bearing pin
11 End wall of the bearing carrier
12 Cylindrical projection of the tensioner housing
13 Axle threaded connection of the drive wheel
14 Screw-on flange of the bearing carrier
15 Fastening point of the bearing carrier
16 Axle bolt of the movable tensioning roller
17 Tensioning arm
18 Axle bolt of the fixed tensioning roller
19 Locking pin
20 Spring component/bow spring
21 Housing cover
22 Receptacle space
23 Inner spring end
24 Intermediate piece
25 Outer spring end
26 Set-off section of the tensioning arm
27 End wall of the receptacle space
28 Pin projection of the tensioning arm
29 Hole of the intermediate piece
30 Sliding bearing piece
31 Tab of the sliding bearing piece
32 Longitudinal wall of the receptacle space
33 Spacer
34 Additional sliding bearing piece
35 Sealing element

The invention claimed is:

1. Tensioning device for a belt drive that has an endlessly circulating belt, an electric machine with a drive wheel and at least one additional drive wheel that is in drive connection with the drive wheel via the belt, wherein the tensioning device comprises:
a tensioner housing supported on the electric machine to pivot about an axis of the drive wheel,
a tensioning arm movably supported in the tensioner housing,
two tensioning rollers that apply a biasing force on the belt in front of and behind the drive wheel in a circulating direction of the belt, wherein one of the tensioning rollers is supported on the tensioning arm and the other of the tensioning rollers is supported fixed in place on the tensioner housing,
and a spring component that generates the biasing force and having spring ends clamped on one side between the tensioner housing and on the other side on the tensioning arm,
the spring component comprises two helical compression springs that are connected in series and having facing spring ends separated by an intermediate piece slidably supported in the tensioner housing, the tensioning arm has a pin projection that passes through the helical compression spring and is slidably supported in the intermediate piece.

2. Tensioning device according to claim 1, wherein the pin projection has a circular arc-shaped construction and the helical compression springs are formed as bow springs.

3. Tensioning device according to claim 2, wherein the bow springs are identical parts.

* * * * *